Patented May 6, 1930

1,757,755

UNITED STATES PATENT OFFICE

FREDERICK C. HAHN, OF WILMINGTON, DELAWARE, ASSIGNOR TO E. I. DU PONT DE NEMOURS & COMPANY, OF WILMINGTON, DELAWARE, A CORPORATION OF DELAWARE

COLLOIDED CELLULOSE AND INDURATED FIBER

No Drawing. Application filed February 8, 1928. Serial No. 252,942.

This invention relates to a process by which cellulose may be gelatinized without solution and thereby rendered suitable for further chemical and mechanical treatment to meet the various requirements of the arts. It relates further to a process of producing cellulose fiber products, e. g., an indurated fiber.

It is known that cellulose may be gelatinized by various methods and that in general, the gelatinized condition may be reversed and the cellulose brought back approximately to normal by removing the gelatinizing conditions. In some of the known gelatinizing processes, cellulose has been first brought into solution and afterwards gelled by removing the solvent, by changing the conditions or by chemical treatment. In other known processes, cellulose fiber has been gelatinized by chemical treatment without solution and later restored to approximately the normal cellulose condition by removal of the chemical reagent. For example, in the usual process of producing indurated fiber, the cellulose fiber is gelatinized without solution or with incomplete solution by treating with zinc chloride solution. The gelatinized product is then mechanically compressed to cement the fibers together, and the gelatinized condition is reversed by dissolving out the gelatinizing reagent. The present invention is concerned only with cellulose gelatinizing processes in which the fiber is not dissolved or is only partly dissolved so that the individual fibers do not lose their identity.

One object of this invention is to gelatinize cellulose fiber without solution or with incomplete solution. It is another object of this invention to gelatinize cellulose fiber without solution thereby producing a plastic product suitable for further chemical or mechanical treatment to meet various requirements of the arts. A still further object is an improved process of producing cellulose fiber products, e. g., an indurated fiber.

I have discovered that cellulose may be readily and economically gelatinized without solution by treating with an aqueous solution of fixed caustic alkali under definite conditions of temperature and concentration.

As a reagent for gelatinizing cellulose, I use an aqueous solution of fixed caustic alkali containing from about 2 to 11 mols alkali per 100 mols water. With this reagent I produce practically any desired degree of gelatinization by treating the cellulose with the gelatinizing reagent at a temperature between the freezing point of the reagent and a point about 20° C. higher, the treatment being continued until the desired degree of gelatinization has been accomplished. In general, the gelatinization of the cellulose takes place very quickly unless the condition of the fiber is such as to retard the wetting of the fiber by the gelatinizing reagent.

By this process, the cellulose of the individual fibers is partially or completely gelatinized without solution or with incomplete solution. The fiber swells and becomes plastic and in this condition is suited by virtue of its chemical and physical properties to serve as an intermediate product for many and various chemical and mechanical processes. When gelatinized, the cellulose so prepared becomes plastic so that new shapes, forms, and arrangements may be impressed on the individual fibers; and these shapes and forms may be retained after the gelatinizing conditions are removed.

By suitable mechanical treatment, I may convert the gelatinized fiber into many different products some of which are new and some of which are similar to products heretofore produced commercially by less satisfactory methods. I may, for example, convert my gelatinized cellulose into an indurated fiber or into a parchmentized or strengthened paper, or, I may use the process for treating cotton fabrics to prevent linting, an object desirable in the manufacture of tire liners. In general, I may use the gelatinizing process of the invention followed by a suitable mechanical treatment in the gelatinized condition for treating cellulose fiber originally in the form of woven, non-woven or matted materials to form final products, having the fibers more or less firmly bound one to another by adhesion at the fiber surface. In the gelatinized condition, the cellulose is in a chemically reactive state which makes this material peculiarly suitable to serve as the starting point for various chemical processes.

I produce indurated fiber by treating the cellulose fiber, preferably made up into paper or other matted form, with caustic soda or other fixed caustic alkali under the above described conditions of temperature and concentration. While the fiber is in the gelatinized state, I apply pressure to cement the fibers together at the surface; and thereafter, I dissolve out the gelatinizing reagent to reverse the gelatinizing reaction.

As raw material, I may use in my process various commercial forms of cellulose, particularly cellulose fiber which is not readily soluble in the gelatinizing reagent under the conditions of use. Thus, I may use rag pulp, sulfite pulp, kraft pulp, or other forms of cotton or wood pulp such as are ordinarily used for making various grades of paper, or, I may use a fiber prepared from cotton linters by purification by treatment with dilute caustic soda under heat and pressure. For use in my process, however, the chemical purification treatment is preferably not so drastic that the fiber readily dissolves in cold dilute caustic under the conditions of gelatinization described above. I find, for example, that 5 to 10 hour cooked cotton linters (i. e. cotton linters cooked with 2% caustic soda at 80 lb. pressure from 5 to 10 hours) is suitable for use in my process. On the other hand, 20 hour linters, is much less suitable because it tends to dissolve under the conditions of gelatinization.

As gelatinizing reagent in my process, I may use caustic soda, caustic potash or other fixed caustic alkali dissolved in water to a concentration between 2 and 11 mols alkali per 100 mols water. For many purposes I prefer to maintain the concentration within a range between 2.5 and 8 mols caustic per 100 mols water.

For gelatinizing the fiber I use a temperature which is within a range of about +8 to −12° C. I prefer to operate at a temperature above the freezing point of the reagent and thereby avoid changes in alkali concentration due to freezing. The most favorable temperatures for carrying out the process of the invention are contained within a range between the freezing point of the reagent and a point about 20° C. higher. In general, the solubility of cellulose fibers in dilute caustic solutions increases with decreasing temperatures, and with some grades of fiber becomes marked at temperatures near the freezing point of the solution. When using such grades of fiber it is preferable to operate at a somewhat higher temperature than otherwise. When using grades of fiber which are soluble in the gelatinizing reagent at the freezing point, it is preferable to carry out the gelatinizing reaction at a temperature which is between the upper temperature limit at which the fiber is readily soluble in the reagent and a point about 20° C. higher.

The following is a specific example of my process for gelatinizing cellulose fiber: I take a fiber, for example, kraft paper preferably containing little or no size, filler, etc. The kraft paper is gelatinized by thoroughly wetting or impregnating with a 10% caustic soda solution maintained at the temperature of −5° C. When the paper is thoroughly impregnated, the gelatinizing reaction is quickly completed and the individual fibers of the paper are swelled and become plastic. In this condition, the fiber may be forced to take any desired shape and this shape may be maintained after the gelatinizing conditions are removed. For example, I produce indurated fiber by gelatinizing kraft paper as described above; and while in the gelatinized condition, the paper is compressed to cement the fibers together. This compression may be accomplished by passing the sheet of gelatinized paper between rollers or it may be pressed between metal plates. In order to build up a sheet of greater thickness, I lay together as many sheets of gelatinized paper as are required and I press this between rollers or metal plates, as in the case of the single sheet. After gelatinizing and pressing, the gelatinizing reagent is dissolved out by washing with water; and when dried, the paper becomes hard and tough and has substantially the properties of commercial indurated fiber.

In comparison with prior art processes of gelatinizing cellulose and of producing indurated fiber, the process of this invention has the advantage that it is more expeditious and that the gelatinizing reaction and the reverse reaction take place with practically no oxidation or degradation of the cellulose.

As many apparently widely different embodiments of this invention may be made without departing from the spirit thereof, it is to be understood that I do not intend to limit myself to the specific embodiments thereof except as indicated in the appended claims.

I claim:

1. The process of gelatinizing cellulose which comprises preparing a gelatinizing reagent comprising fixed caustic alkali dissolved in water in the proportion of from 2 to 11 mols alkali per 100 mols water and treating said cellulose with said gelatinizing reagent at a temperature between the freezing point of the reagent and a point about 20° C. above said freezing point.

2. The process of gelatinizing cellulose which comprises preparing a gelatinizing reagent comprising fixed caustic alkali dissolved in water in the proportion of from 2.5 to 8 mols alkali per 100 mols water and treating said cellulose with said gelatinizing reagent at a temperature between the freezing point of the reagent and a point about 20° C. above said freezing point.

3. An improved process of gelatinizing cellulose, which comprises treating said cellulose which is not more than slightly soluble in the gelatinizing reagent under the conditions of working, with a gelatinizing reagent comprising a fixed caustic alkali dissolved in water in the proportion of from 2 to 11 mols caustic per 100 mols water, at a temperature between the freezing point of the gelatinizing reagent and a point about 20° C. above said freezing point, and continuing said treatment until the desired degree of gelatinization is attained.

4. An improved process of gelatinizing cellulose, which comprises treating said cellulose which is not more than slightly soluble in the gelatinizing reagent under the conditions of working, with a gelatinizing reagent comprising a fixed caustic alkali dissolved in water in the proportion of from 2.5 to 8 mols caustic per 100 mols water, at a temperature between the freezing point of the gelatinizing reagent and a point about 20° C. above said freezing point, and continuing said treatment until the desired degree of gelatinization is attained.

5. An improved process of gelatinizing cellulose, which comprises treating said cellulose with a gelatinizing reagent comprising fixed caustic alkali dissolved in water in the proportion of from 2 to 11 mols caustic per 100 mols water, at a temperature between the freezing point of the gelatinizing reagent and a point about 20° C. above said freezing point, and continuing said treatment until the desired degree of gelatinization is attained, and discontinuing such treatment before the cellulose becomes dissolved to a substantial extent.

6. An improved process of gelatinizing cellulose, which comprises treating said cellulose with a gelatinizing reagent comprising fixed caustic alkali dissolved in water in the proportion of from 2.5 to 8 mols caustic per 100 mols water, at a temperature between the freezing point of the gelatinizing reagent and a point about 20° C. above said freezing point, and continuing said treatment until the desired degree of gelatinization is attained, and discontinuing such treatment before the cellulose becomes dissolved to a substantial extent.

7. A process of gelatinizing cellulose, which comprises treating said cellulose with a gelatinizing reagent comprising fixed caustic alkali and water in the proportion of from 2 to 11 mols caustic per 100 mols water, at a temperature which is between the upper temperature limit at which the cellulose is readily soluble in the gelatinizing reagent and a point about 20° C. above said upper temperature limit, and continuing said treatment until the desired degree of gelatinization is attained.

8. A process of gelatinizing cellulose, which comprises treating said cellulose with a gelatinizing reagent comprising fixed caustic alkali and water in the proportion of from 2.5 to 8 mols caustic per 100 mols water, at a temperature which is between the upper temperature limit at which the cellulose is readily soluble in the gelatinizing reagent and a point about 20° C. above said upper temperature limit, and continuing said treatment until the desired degree of gelatinization is attained.

9. An improved process of producing cellulose products, which comprises treating cellulose fiber, which is not more than slightly soluble in a gelatinizing reagent, under the conditions of working with a gelatinizing reagent comprising fixed caustic alkali dissolved in water in the proportion of from 2 to 11 mols caustic per 100 mols water, at a temperature between the freezing point of the gelatinizing reagent and a point about 20° C. above said freezing point; continuing said treatment until the desired degree of gelatinization is attained; shaping the gelatinized fiber by mechanical means, and washing the gelatinizing reagent out of the product.

10. An improved process of producing cellulose products, which comprises treating cellulose fiber, which is not more than slightly soluble in a gelatinizing reagent, under the conditions of working with a gelatinizing reagent comprising fixed caustic alkali dissolved in water in the proportion of from 2.5 to 8 mols caustic per 100 mols water, at a temperature between the freezing point of the gelatinizing reagent and a point about 20° C. above said freezing point; continuing said treatment until the desired degree of gelatinization is attained; shaping the gelatinized fiber by mechanical means, and washing the gelatinizing reagent out of the product.

11. The process of producing indurated fiber which comprises gelatinizing incompletely dissolved cellulose with an aqueous solution of caustic alkali, compressing the incompletely dissolved cellulose to cement the fibers together at the surface and dissolving out the gelatinizing reagent to reverse the gelatinizing reaction.

12. An improved process of producing indurated fiber which comprises treating cellulose fiber, which is in the form of a sheet, and which is not readily soluble in the gelatinizing reagent under the conditions of working, with a gelatinizing reagent comprising caustic soda dissolved in water in the proportion of from 2 to 11 mols caustic per 100 mols water at a temperature between about +8 and −10° C., continuing the treatment until the fiber is at least superficially gelatinized, compressing the gelatinized fiber to cement the fibers together, and washing out of the gelatinizing reagent.

13. An improved process of producing an indurated fiber which comprises treating cellulose fiber in the form of a sheet with a gelatinizing reagent comprising caustic soda dissolved in water in the proportion of from 2 to 11 mols caustic per 100 mols water at a temperature which is between the upper temperature limit at which the fiber is readily soluble in the gelatinizing reagent and a point about 20° C. above said temperature limit, continuing the treatment until the fiber is at least superficially gelatinized, compressing the gelatinized fiber to cement the fibers together and washing out the gelatinizing reagent.

In testimony whereof I affix my signature.

FREDERICK C. HAHN.